United States Patent

[11] 3,548,972

| [72] | Inventor | William G. Flannelly |
| | | South Windsor, Conn. |
| [21] | Appl. No. | 808,254 |
| [22] | Filed | Mar. 18, 1969 |
| [45] | Patented | Dec. 22, 1970 |
| [73] | Assignee | Kaman Aerospace Corporation |
| | | Bloomfield, Conn. |
| | | a corporation of Delaware. by mesne assignment |

[54] VIBRATION ABSORBER WITH ROTATING MASS
9 Claims, 1 Drawing Fig.

| [52] | U.S. Cl. | 188/1, 188/103 |
| [51] | Int. Cl. | F16f 7/10 |
| [50] | Field of Search | 74/574; 188/1B, 103; 248/358 |

[56] References Cited
UNITED STATES PATENTS

| 3,259,212 | 7/1966 | Nishioka et al. | 188/1(B) |
| 3,306,399 | 2/1967 | Flannelly | 188/1(B) |

*Primary Examiner*—Duane A. Reger
*Attorney*—Mc Cormick, Paulding and Huber

ABSTRACT: A vibration absorber for absorbing vibrations of a vibrating structure occurring in a given plane consists of a ballast mass driven in rotation about a rotational axis perpendicular to the plane of vibration. Under conditions of no vibration the center of gravity of the ballast mass is located on the rotational axis, but the mass is connected to the vibrating structure by a universal joint which permits the center of gravity to move away from the rotational axis under the influence of the vibrations. For a given speed of the ballast mass forces are produced which exactly or at least very closely cancel or oppose vibrations occurring at a given antiresonant frequency. The antiresonant frequency is dependent upon the speed of rotation of the ballast mass so that by properly selecting such speed any desired frequency of vibration may be absorbed.

PATENTED DEC 22 1970
3,548,972
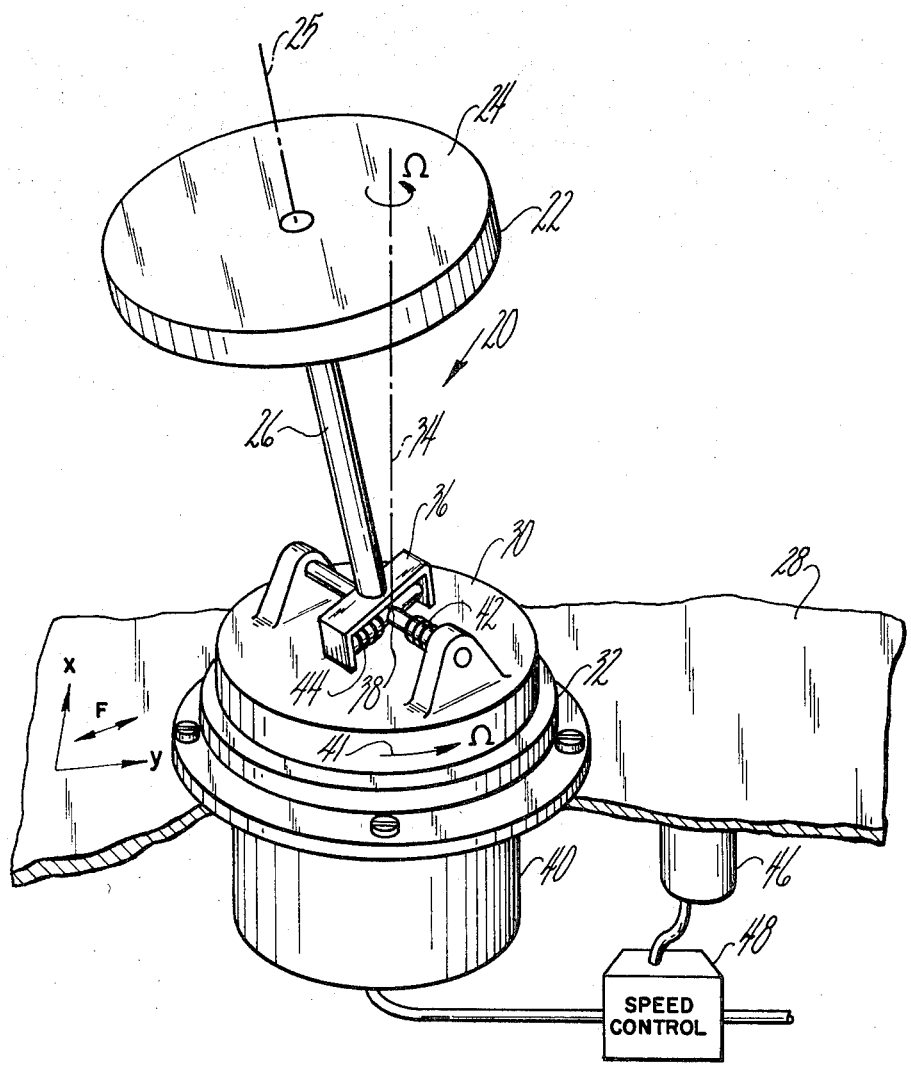
INVENTOR.
WILLIAM G. FLANNELLY
BY
McCormick, Paulding & Huber
ATTORNEYS

3,548,972

VIBRATION ABSORBER WITH ROTATING MASS

BACKGROUND OF THE INVENTION

This invention relates to vibration absorbers, and deals more particularly with an active vibration absorber including a rotational ballast mass for absorbing vibrations occurring in a given plane.

In the past various different active vibration absorbers have been proposed wherein various masses have been driven in one fashion or another to provide forces counteracting the vibrations of an associated structure and to thereby reduce the vibratory movements of such structure. These absorbers have, however, generally required relatively complicated driving systems and relatively heavy masses in comparison to the vibratory forces involved. Also, vibrations are normally comprised of one predominant frequency component which is often not fixed and may vary widely during different operating conditions or speeds of the vibrating structure, so that if the absorber is "tuned" to one frequency of vibration it may not effectively absorb vibrations occurring at other frequencies. Therefore, it is desirable that an absorber be readily tunable to match the predominant component frequency of the vibration, and this has not been the case with many previously proposed absorbers.

Accordingly, an object of this invention is to provide a very simple active vibration absorber consisting of a single rotationally driven mass which mass is capable of absorbing or counteracting vibratory forces of very large magnitude in comparison to its own weight. Another object of the invention is to provide such a vibration absorber which yields very effective vibration absorbing characteristics at a given antiresonant frequency and wherein such antiresonant frequency may be readily changed at will, or automatically, to match the predominant component frequency of the vibration of the vibrating structure.

SUMMARY OF THE INVENTION

The invention resides in an active vibration absorber comprising a ballast mass adapted to be rotated about a rotational axis perpendicular to a plane in which vibrations occur in an associated vibrating structure. In its neutral position the ballast mass has its center of gravity located on the rotational axis, but it is connected to the vibrating structure by a universal joint or other similar means which allows its center of gravity to move away from the rotational axis, under the influence of the vibration forces, by pivoting about a pivot point located on the rotational axis. This movement of the ballast mass center of gravity away from the rotational axis produces forces which at a given speed of the ballast mass exactly, or at least very closely, balance the vibrational forces. A speed control means may be used to control the speed of rotation of the ballast mass to maintain the absorber tuned to the frequency of the main component of the vibration.

BRIEF DESCRIPTION OF THE DRAWING

The single figure of the drawing is a perspective view showing a vibration absorber embodying this invention.

DESCRIPTION OF THE PREFERRED EMBODIMENT

Turning to the drawing, a vibration absorber embodying this invention is there illustrated generally at 20 and includes a ballast mass 22 consisting of a circular disc 24 and a stem or leg 26 fixed to the disc 24 at its center and extending in one direction therefrom, or generally downwardly in the figure, along the central axis 25 of the disc. The leg 26 and disc 24 are symmetrical about the central axis of the disc and the mass of the leg 26 is relatively small in comparison to that of the disc so that the center of gravity of the ballast mass is located on the central axis of the disc and close to or within the space between the upper and lower faces of the disc. The center of gravity of the ballast mass is therefore spaced from the lower end of the leg 26 by a distance equal to approximately the length of the leg.

In the figure, the reference number 28 indicates part of a vibrating structure with which the absorber 20 is used for the purpose of absorbing vibrations. These vibrations in the illustrated case occur in the plane of the part 28, that is within the plane of the X-Y coordinate system there shown, the arrow F indicating the direction of the vibrations. The ballast mass 22 is supported for rotation about an axis which, during a condition of no vibration, is located substantially perpendicular to the plane on which the vibrations occur, while also being free to pivot universally about a point, fixed relative to the vibrating structure, located substantially on such rotational axis and spaced from said center of gravity to allow said center of gravity to move relative to the vibrating structure about such pivot point under the influence of the vibrations. The means for so supporting the ballast mass may vary widely without departing from the invention and in the illustrated case comprise a rotatable base 30 mounted to the structure 28 by a suitable bearing assembly, indicated at 32, and supported by such bearing assembly for rotation about an axis 34 fixed relative to the structure 28 and oriented perpendicular to the plane in which the vibrations occur. Between the base 30 and leg 26 of the ballast mass is a universal joint 36 which transmits the rotation of the base to the ballast mass and permits the ballast mass to pivot universally relative to the base 30 about its central pivot point 38.

The rotatable base 30 is in the operation of the absorber, driven about the axis 34 by an associated motor 40 in the direction of the arrow 41 at a given angular velocity. The forces imposed on the ballast mass by this rotation of the base 30 are such that under conditions of no vibration of the structure 28, the ballast mass will assume a neutral or equilibrium position at which its central axis 25 is aligned with the axis 34. Preferably, means are provided for statically biasing the ballast mass 22 toward such equilibrium position so that it will be close to such position when rotation of the base 38 is initiated and thereby provide a smooth start up. If the absorber is arranged so that the ballast mass extends downwardly rather than upwardly from the universal joint 36, gravity may be used as the biasing means. In the illustrated case, however, two springs 42 and 44, working respectively between the base 30 and the universal joint and between the universal joint and the leg 26, are shown for this purpose. It should be understood, however, that the springs 42 and 44 are not essential to the broader aspects of the invention and during the rotation of the ballast mass are not required to achieve the vibration absorbing effect.

As mentioned, under conditions of no vibration, the ballast mass 22, due to the rotation of the base 30, has its central axis 25 aligned with the axis 34 and rotates about the axis 34. Under the influence of vibrations occurring in the plane normal to the axis 34, however, such as the vibrations indicated by the arrow F, the ballast mass 22 pivots about the pivot point 38 of the universal joint 36 and in doing so produces vibrating forces which are transmitted to the vibrating structure 28 through the rotating base 30 and bearing 32. At one frequency of vibration of the vibrating structure, or forcing vibration, referred to as the antiresonant frequency, these vibrating forces produced by the ballast mass exactly or very closely balance or counteract the forcing vibration so that the resultant vibration of the structure 28 is reduced to zero or other very low valve.

By a mathematical analysis of the absorber 20, it can be shown that its antiresonant frequency, if the mass of the leg 26 is neglected, is given approximately by the equation:

$$\omega = \Omega \frac{I_z}{I_d + MH^2}$$

where $\omega$ is the antiresonant frequency, $I_d$ is the movement of inertia of the disc 22 about its diameter, $\Omega$ is the speed or rotation of the disc, M is the mass of the disc, H is the spacing between the pivot point 38 of the universal joint and the center of gravity of the disc and $I_z$ is the polar movement of inertia of the disc about its axis.

From this equation, it will be noted that the antiresonant frequency is directly dependent on the speed of rotation of the ballast mass and, therefore, by properly selecting this speed, the antiresonant frequency characteristic of the absorber may be matched with or tuned to the frequency of the forcing vibration, so as to effectively counteract or absorb such vibration.

In cases where the frequency of the forcing vibration remains substantially constant, the absorber 20 may be designed so that the motor 40 operates at a single constant speed selected to provide an antiresonance at such frequency. In many cases, however, the frequency of the forcing vibration varies with time, and in such cases it is desirable that the motor 40 be so controlled that the speed at which it drives the base 30 varies in accordance with variations in the frequency of the forcing vibration to maintain the absorber constantly tuned to such frequency. Such a control means may vary widely and in the illustrated case is shown to constitute a vibration detector 46 connected with the vibrating structure 28 for producing a signal representing the frequency of the forcing vibration and an associated speed control unit 48 responsive to such signal for controlling the excitation of the motor 40 in accordance with a predetermined characteristic of speed versus frequency as required to produce antiresonance at each frequency of the forcing vibration.

I claim:

1. A vibration absorber for absorbing vibrations of a given vibrating structure occurring in a given plane, said absorber comprising a ballast mass, means for supporting said ballast mass for rotation about a rotational axis orientated generally perpendicular to said plane, said support means including means permitting said mass to pivot universally about a point located substantially on said rotational axis and spaced from the center of gravity of said mass to allow said center of gravity to move relative to said vibrating structure about said given point under the influence of said vibration, and means for driving said ballast mass in rotation about said rotational axis.

2. A vibration absorber as defined in claim 1 further characterized by means for controlling the speed at which said driving means drives said ballast mass in response to the frequency of said vibration.

3. A vibration absorber for absorbing vibrations of a given vibrating structure occurring in a given plane, said absorber comprising a first part, means supporting said first part for rotation about a rotational axis fixed relative to said vibrating structure and oriented perpendicular to said given plane, means for driving said first part in rotation about said rotational axis, a ballast mass, and means connecting said ballast mass to said first part for rotation thereby with the center of gravity of said ballast mass located generally on said rotational axis and for permitting said center of gravity to move in any direction away from said rotational axis during such rotation.

4. A vibration absorber as defined in claim 3 further characterized by said means connecting said ballast mass to said first part comprising a universal joint having a pivot center located approximately on said rotational axis.

5. A vibration absorber as defined in claim 3 further characterized by means for biasing said ballast mass relative to said first part to bring said center of gravity of said ballast mass close to said rotational axis when said first part is stationary.

6. A vibration absorber as defined in claim 3 further characterized by said ballast mass including a leg extending a substantial distance along said rotational axis from the point of connection between said first part and said ballast mass and a generally disc-shaped mass fixed to said leg at a point spaced from said point of connection.

7. A vibration absorber as defined in claim 3 further characterized by means for varying the speed at which said driving means rotates said first part about said rotational axis.

8. A vibration absorber as defined in claim 7 further characterized by means for controlling the speed at which said first part is driven in response to the frequency of said vibrations of said given vibrating structure.

9. A vibration absorber as defined in claim 3 further characterized by said means connecting said ballast mass to said first part comprising a universal joint having a pivotal center located approximately on said rotational axis, said ballast mass comprising a mass connected with said universal joint which in a neutral position relative to said rotational axis has its center of gravity located on said rotational axis and spaced a substantial distance from said pivotal center, said ballast mass being symmetrically distributed about said rotational axis when in said neutral position.